United States Patent [19]
Rubin

[11] Patent Number: 5,442,359
[45] Date of Patent: Aug. 15, 1995

[54] APPARATUS AND METHOD FOR MITIGATING RANGE-DOPPLER AMBIGUITIES IN PULSE-DOPPLER RADARS

[75] Inventor: William L. Rubin, Whitestone, N.Y.

[73] Assignee: Unisys Corporation, Blue Bell, Pa.

[21] Appl. No.: 268,698

[22] Filed: Jun. 30, 1994

[51] Int. Cl.⁶ .................. G01S 13/526; G01S 13/53; G01S 13/538; G01S 13/95
[52] U.S. Cl. .................. 342/109; 342/26; 342/115; 342/137; 342/162; 342/189
[58] Field of Search .................. 342/109, 26, 111, 112, 342/115, 116, 137, 162, 192, 194, 195, 203, 189

[56] References Cited

U.S. PATENT DOCUMENTS

| | | | |
|---|---|---|---|
| 3,624,650 | 11/1971 | Paine et al. | 342/145 |
| 3,727,222 | 4/1973 | Hollis | 342/80 |
| 5,130,712 | 7/1992 | Rubin et al. | 342/26 |
| 5,252,980 | 10/1993 | Gray et al. | 342/59 |
| 5,262,782 | 11/1993 | Rubin et al. | 342/26 |
| 5,276,453 | 1/1994 | Heymsfield et al. | 342/112 |
| 5,307,070 | 4/1994 | Runge et al. | 342/25 |
| 5,359,330 | 10/1994 | Rubin et al. | 342/26 |

*Primary Examiner*—John B. Sotomayor
*Attorney, Agent, or Firm*—Seymour Levine; Stanton D. Weinstein; Mark T. Starr

[57] ABSTRACT

A method and apparatus for resolving Doppler frequency shift ambiguities in pulse Doppler radar systems provides a radiated signal that is modulated with a periodic waveform having a plurality of pulses within a period, the interpulse intervals between pulses in the period being unequal. Radar target returns are autocorrelated for a plurality of lags, which may include the interpulse intervals and linear combinations thereof. The calculated arguments $\theta_{Ci}$ of the autocorrelation function are unwrapped by adding $2k\pi$, $k = 0, \pm 1, \pm 2, \ldots$, to the phase $\theta_{C1}$ obtained for the shortest lag $T_1$ and determining an integer $m_{k2}$ from $|(\theta_{C2} + 2m_{k2}\pi) - (T_2/T_1)\theta_{C1}| < \pi$ and then setting $\theta_2 = \theta_{C2} + 2m_{k2}\pi$. Phase angles $\theta_3, \theta_4, \ldots, \theta_m$ are unwrapped in a similar manner, the integer $m_{ki}$ being determined from $|(\theta_{Ci} + 2m_{ki}\pi) - (T_i/T_{i-1})\theta_{Ci}| < \pi$. The unwrapped phase angles and the point (0,0) are least mean square fitted to lines of phase angle vs lag for each value of k. The root mean square error of the phase angle offset from each line is determined and the slope of the line with the minimum RMS error is chosen as the Doppler frequency shift from which the velocity of the target is extracted.

7 Claims, 9 Drawing Sheets

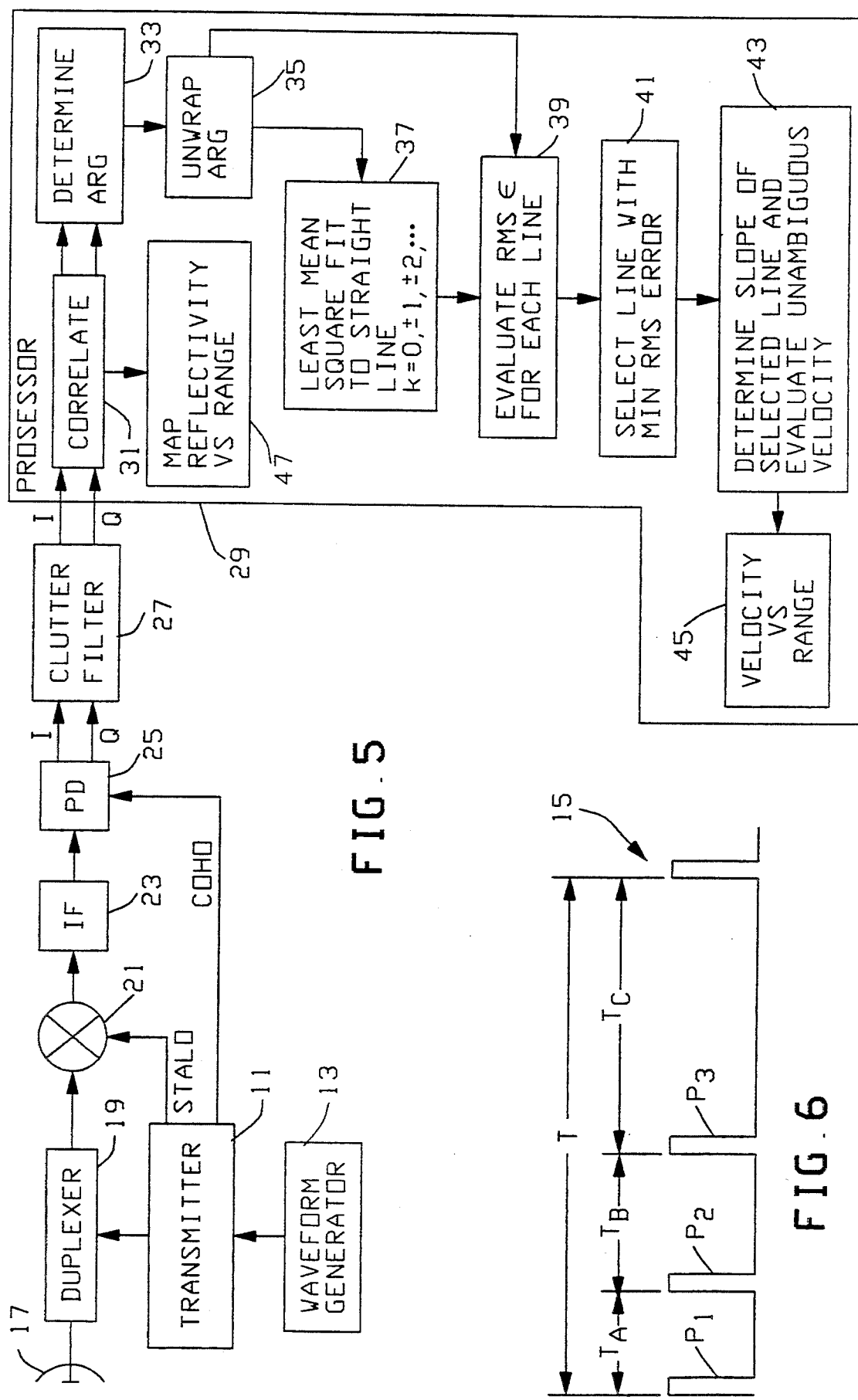

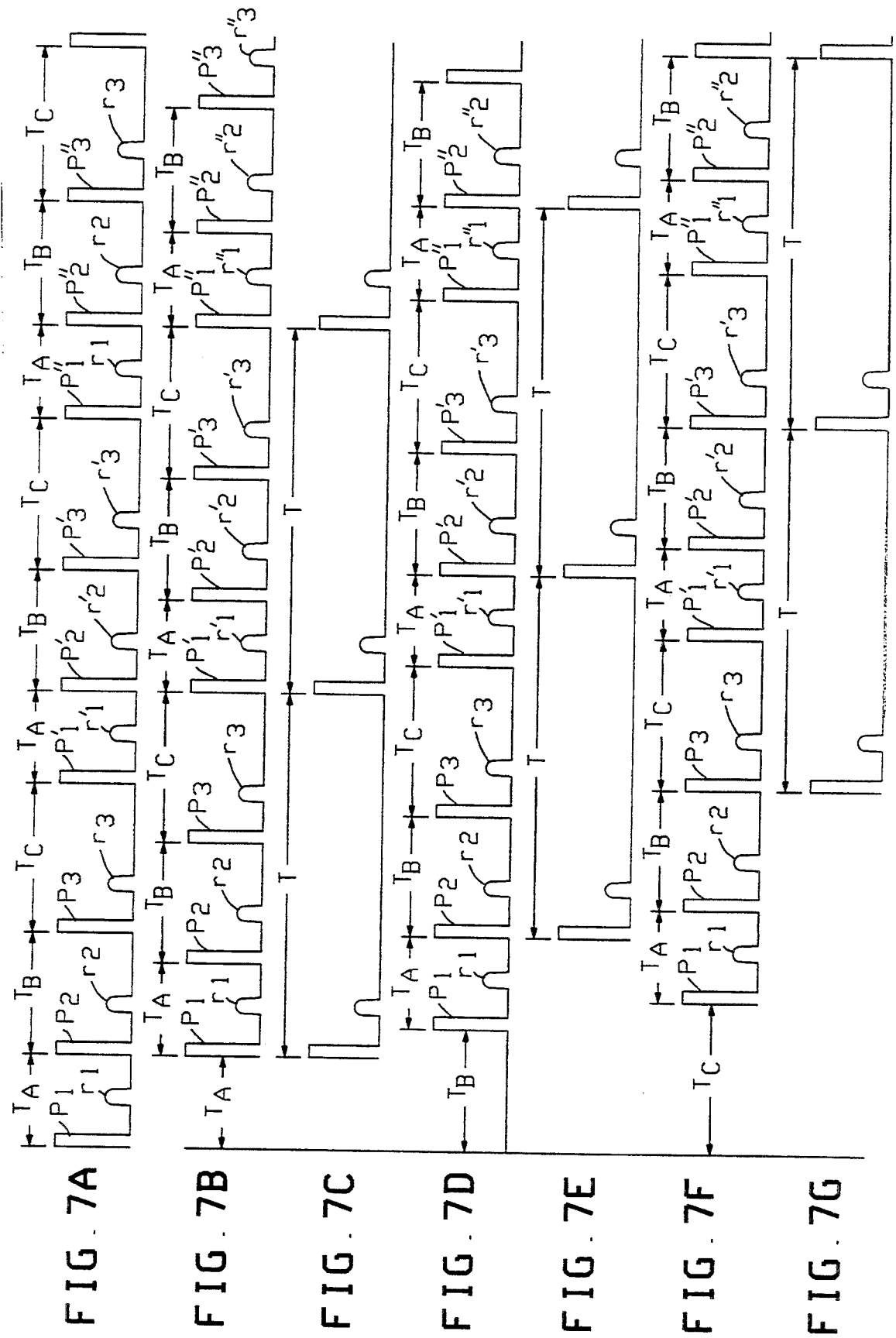

APPARATUS AND METHOD FOR MITIGATING RANGE-DOPPLER AMBIGUITIES IN PULSE-DOPPLER RADARS

BACKGROUND OF THE INVENTION

1. Field of the Invention

The invention pertains to the field of pulse Doppler radar systems and more particularly to the elimination of range and Doppler ambiguities in such radar systems.

2. Description of the Prior Art

A pulse Doppler radar system suffers a serious performance deficiency, referred to as the pulse Doppler dilemma, which stems from the relationship between the pulse repetition rate and the measurable unambiguous range and Doppler frequency. This deficiency constrains the data quality of weather parameter measurements obtained with pulse Doppler radar systems.

As is well known, a pulse radar system determines the range to a target, which for a weather radar system is the atmospheric volume, by measuring the elapsed time between the transmission or a radar pulse and the subsequent reception of the target's backscatter of that pulse, the elapsed time being $t=(2R)/C$, where R is the range to the target and C is the velocity of light. Since the receiver can not distinguish between a return from a target of the most recent transmitted pulse and a return from another target of an earlier transmitted pulse, the maximum unambiguous time available for unambiguous receiver reception is the time between successive pulse transmissions. Thus, the maximum unambiguous range is $R_{max}=(CT)/2$, T being the interpulse transmission interval. As is also well known, a pulse Doppler radar system determines the relative velocity of a target by measuring the Doppler shift of a spectral line of the radiation frequency spectrum of the received backscattered pulse train. The spectral lines in such systems are established by the transmission of a train of pulses at a given repetition rate. The frequency spacing between these spectral lines is equal to the repetition rate of the pulse train, which is equal to $(1/T)$. When a target (backscatter) is moving in a direction which causes the radial distance between the target and the transmitter to decrease (closing target), the spectral line frequency increases by $f_{DC}=(2v_C)/\lambda$, $\lambda$ being the wavelength of the radiated wave. Conversely, when the target is moving in a direction which causes the radial distance between the target and the transmitter to increase (opening target), the spectral line frequency decreases by $f_{DO}=(2v_o)/\lambda$. In such pulse doppler radar systems the $n^{th}$ spectral line is chosen as a reference and the Doppler frequency shift of this spectral line in the frequency bands between it and the two adjacent spectral lines, $n-1$ and $n+1$, is measured to obtain the velocity of the target. As will subsequently be more fully explained, the $1/T$ spacing of the spectral lines limit the unambiguous measurement of the Doppler shifted spectral line $f_n$ to the band $f_n \pm 1/(2T)$. Consequently, the maximum unambiguous velocity, $V_{max}$, that can be measured is $$V_{max}=\pm\lambda/(4T)$$

This result may also be obtained with the application of the well known sampling theorem, which states that a coherently detected radar signal must be measured at sample time spacings that are no greater than $1/(2f_D)$ to unambiguously measure $f_D$. If $f_D$ is the maximum unambiguous detectable Doppler frequency, it follows that the maximum unambiguous measurable target velocity, $V_{max}$, that can be measured for an interpulse interval, $T=1/f_D$, is $V_{max}=\pm\lambda/(4T)$.

Thus it is apparent that the maximum unambiguous range that can be measured with a pulse doppler radar system increases with increasing interpulse intervals, while the maximum unambiguous velocity that can be measured decreases with increasing interpulse intervals. In many instances the unambiguous velocities to be measured by a pulse doppler radar system require interpulse intervals that are too short to provide the desired maximum unambiguous range measurement.

Multiplying the maximum range expression $R_{max}$ by the maximum velocity expression $V_{max}$ yields the well known "pulse Doppler dilemma"

$$R_{max}V_{max}=(C\lambda)/8$$

This dilemma is illustrated in FIG. 1 for a pulse doppler radar operating at 3 GHz.

Since the range to a target is determined by the elapsed time between the transmission of a pulse and the reception of its echo, echoes of previously transmitted pulses returned from targets at ranges beyond $C/(2T)$ appear at range positions in the range interval of the last transmitted pulse. This condition is known as "range folding" and is illustrated in FIGS. 2 and 3.

A pulse train having an interpulse interval of sufficient length to permit radar returns of a transmitted pulse from targets at all ranges of interest before the transmission of the succeeding pulse is shown in FIG. 2. As shown in the figure, target returns $R_{S11}$, $R_{S12}$, and $R_{S13}$, of the transmitted pulse $T_{S1}$, from targets at three different ranges are received prior to the transmission of the succeeding pulse $T_{S2}$. Similarly, returns $R_{S21}$, $R_{S22}$, and $R_{S23}$ and $R_{S31}$, $R_{S32}$, and $R_{S33}$ of pulse transmission $T^{S1}$ and $T_{S2}$, respectively, from the same three different ranges are also received prior the transmission of the succeeding pulse. Thus the range to the three targets may be unambiguously determined.

When the pulse repetition rate is increased, as shown in FIG. 3, the ranges to the targets at the same three different ranges cannot be determined unambiguously. Shown in the figure are signal returns ($R_{Fn1}$, $R_{Fn2}$, $R_{Fn3}$; $n=1,2,3,4$) from targets at the same three different ranges resulting from transmissions of pulses $T_{Fn}$ at the higher pulse repetition rate. After the transmission of $T_{F1}$, a signal return is received from the target at the first range ($R_{F11}$) prior to the transmission of the second pulse $T_{F2}$. The signal returns $R_{F12}$ and $R_{F13}$ are not, however, received before the transmission of the pulse $T_{F2}$. The signal return $R_{F12}$ is received in the interval between the transmission of pulses $T_{F2}$ and $T_{F3}$, while the signal return $R_{F13}$ is received in the interval between the transmission of pulses $T_{F3}$ and $T_{F4}$. Similarly, the signal return $R_{F21}$ is received in the interval between the transmissions of pulses $T_{F2}$ and $T_{F3}$, while the signal return $R_{F22}$ is received in the interval between the pulse transmissions $T_{F3}$ and $T_{F4}$, while the signal return $R_{F23}$ is received in the interval between the pulse transmissions $T_{F4}$ and $T_{F5}$. Thus, two returned signals are received in the interval between pulse transmissions $T_{F2}$ and $T_{F3}$ and three in the interval between $T_{F3}$ and $T_{F4}$ and all other interpulse intervals. Though the returns from the three targets appear in the interpulse interval between $T_{F3}$ and $T_{F4}$, and all succeeding interpulse intervals, only one return is due to the transmission of the pulse initiating the interval and only one unambiguous range is measured. For example, the elapsed time between the transmission of the pulse $T_{F3}$ and the reception of the signal $R_{F31}$ provides the correct range to the target from which the pulse was reflected, while the measured elapsed time between the transmission of $T_{F3}$ and the reception of the signals $R_{F13}$ and $R_{F22}$, which are not reflections of the transmitted pulse $T_{F3}$, provide ranges that are ambiguous.

Illustrations of Doppler frequency shifts of spectral lines are shown in FIGS. 4A through 4C. Three spectral lines, $f_{n-1}$, $f_n$, and $f_{n+1}$ ($f_{n+1}=f_n+1/T$; $f_{n-1}=f_n-1/T$) are shown in the figures, $f_n$ being the reference. Doppler shifted frequencies of $f_n$ caused by closing targets with velocities $v \leq \lambda/4T$ are in the frequency band between $f_n+1/(2T)$ and $f_n$, while Doppler shifted frequencies of $f_n$ caused by opening targets, in the same velocity range, are in the band between $f_n$ and $f_n-1/(2T)$. FIG. 4A illustrates the Doppler frequency shift, $\Delta f_C$, of the three spectral lines due to a target decreasing the radial distance at a velocity that is less than $\lambda/(2T)$ and the Doppler frequency shift, $\Delta f_o$, of the three spectral lines caused by a target that is increasing the radial distance at a velocity that is also less than $\lambda/(2T)$. The Doppler shifted spectral lines, $(f_{n-1}+\Delta f_C)$ and $(f_{n+1}+\Delta f_C)$, caused by the closing target and the Doppler shifted spectral lines, $f_{n-1}-\Delta f_o$ and $f_{n+1}-\Delta f_o$, caused by the opening target do not penetrate the frequency band $f_n \pm 1/(2T)$ and the measurement of the Doppler frequency shift is unambiguous.

FIG. 4B illustrates the Doppler shifted spectral lines caused by a target moving radially toward the radar location at a velocity that is greater than $\lambda/(4T)$. In this situation the spectral line $f_n$ is Doppler shifted up to a frequency $f_n+\Delta f_C$ that is out of the frequency band $f_n \pm 1(2T)$, while the spectral line $f_{n-1}$ is Doppler shifted into the frequency band $f_n \pm 1(2T)$.

Since the frequency measurements are restricted to the band $f_n \pm 1(2T)$, the Doppler frequency shift, $f_{DC}$, that is measured is $-[1/T-\Delta f_C]$, which translates to an erroneous radial range opening velocity indication equal to $[-\lambda(1T-\Delta f_C)/2]$ rather than the true closing velocity $\lambda \Delta f_C/2$. It should be recognized that closing velocities are considered positive velocities and opening velocities are considered negative.

FIG. 4C illustrates the Doppler shifted spectral lines caused by a target moving radially away from the radar location at a velocity that is greater than $\lambda/(2T)$. Under these conditions the spectral line $f_n$ is Doppler shifted down to a frequency $f_n-\Delta f_o$, a frequency that is out of the frequency band $f_n \pm 1/(2T)$, while the $+$spectral line $f_{n-1}$ is down shifted to a frequency $f_{n+1}-\Delta f_o$ which is in the frequency band $f_n \pm \Delta f_o$. Consequently, the measurement of the Doppler shift of the spectral line $f_n$ within the frequency band $\pm 1/(2T)$ provides a Doppler frequency, $f_{DO}$, equal to $1/T-\Delta f_o$ rather than the true Doppler frequency shift $\Delta f_o$. The ambiguous Doppler frequency shift represents a velocity equal to $\lambda(1/T-\Delta f_o)/2$ rather than the true velocity $(-\lambda f_o/2)$.

Doppler frequency is determined from the phase shift of the transmitted signal caused by the movement of the backscattering target. Phase is a function of frequency and time and is expressed at $\Phi = 2\pi ft$. Therefore, the phase shift caused by the movement of the target in the interpulse period of FIG. 4B is $\Phi_{DA}=2\pi(f_n+f_{DA})T$. The phase determined from the apparent Doppler shift $f_{DC}$ is $\Phi_M=2\pi(f_n-(1/T)+f_{DA})T=2\pi(f_n+f_{DA})T=2\pi(f_n+f_{DA})-2\pi$. Thus, the actual phase of the signal at the Doppler shifted frequency is related to the measured phase by $\Phi_{DA}=\Phi_M+2\pi$. In FIG. 4A it has been assumed that the movement of the target has shifted the spectral lines by a frequency that is less than $1/T$ so that the Doppler shifted spectral line $f_{n-1}$ does not appear in the $\pm 1/(2T)$ measurement band about $f_n$. The target velocity, however, may be such as to cause the Doppler shifted spectral line $f_{n-k}$ to appear in the measurement band. Consequently, the general expression for the phase ambiguity is $$\Phi_{DA}=\Phi_M+2k\pi$$

It should be apparent that, unless the target velocities are known to cause Doppler shifts of the spectral lines that remain within the band $f_n \pm 1/(2T)$, the phase determination provided by a pulse doppler radar is multiply ambiguous.

To resolve the range and velocity ambiguities, a weather radar of the prior art employs a relatively long interpulse interval, $T_R$, for measuring precipitation reflectivity and a shorter interpulse interval, $T_V$, for measuring radial velocity. To place velocity and spectrum information at the correct range location this prior art system employs a range-unfolding algorithm which compares the amplitude of all the received echoes within the range interval $C/(2T_V)$ of the latest transmitted pulse and selects the one echo amplitude that exceeds a predetermined threshold as the return due to the latest pulse transmission. If none of the echoes exceed this threshold the echo information is not utilized. Consequently, important meteorological velocity information may be discarded because the range to the meteorological scatters can not be determined unambiguously.

SUMMARY OF THE INVENTION

In accordance with the present invention, Doppler frequency shift ambiguities in pulse Doppler radar systems may be resolved by radiating a signal that is modulated with a periodic waveform having a plurality of pulses within a period, the interpulse intervals between pulses in the period being unequal. Radar target returns are autocorrelated for a plurality of lags, which may include the interpulse intervals and linear combinations thereof. The calculated arguments $\theta_{Ci}$ the autocorrelation function are unwrapped by adding $2k\pi$, $k=0$, $\pm 1$, $\pm 2$, ..., to the phase $\theta_{Ci}$ obtained for the shortest lag $T_1$, determining an integer $m_{k2}$ from $|(\theta_{C2}+2m_{k2}\pi)-(T_2/T_1)\theta_{C1}| < \pi$, and then setting $\theta_2=\theta_{C2}+2m_{k2}\pi$. Phase angles $\theta_3$, $\theta_4$, ..., $\theta_m$ are unwrapped in a similar manner, with the integer $m_{ki}$, however, being determined from $|(\theta_{Ci}+2m_{ki}\pi)-(T_{i-1})\theta_{Ci}| < \pi$. The unwrapped phase angles and the point $(0,0)$ are least mean square fitted to lines of phase angle vs lag for each value of k. The root mean square error of the phase angle offset from each line is determined and the slope of the line with the minimum RMS error is chosen as the Doppler radian frequency shift from which the velocity of the target is extracted.

BRIEF DESCRIPTION OF THE DRAWINGS

FIG. 5 is a block diagram of a preferred embodiment of the invention.

FIG. 6 illustrates a period of a periodic modulation for the preferred embodiment of FIG. 5 whereby three unequally spaced pulses are transmitted during each period.

FIGS. 7A through 7G are illustrations of unequally spaced pulse transmission in a period of the periodic modulation and the position of target returns relative to these transmissions which are useful in explaining the autocorrelation process.

DESCRIPTION OF THE PREFERRED EMBODIMENTS

Figure 1:
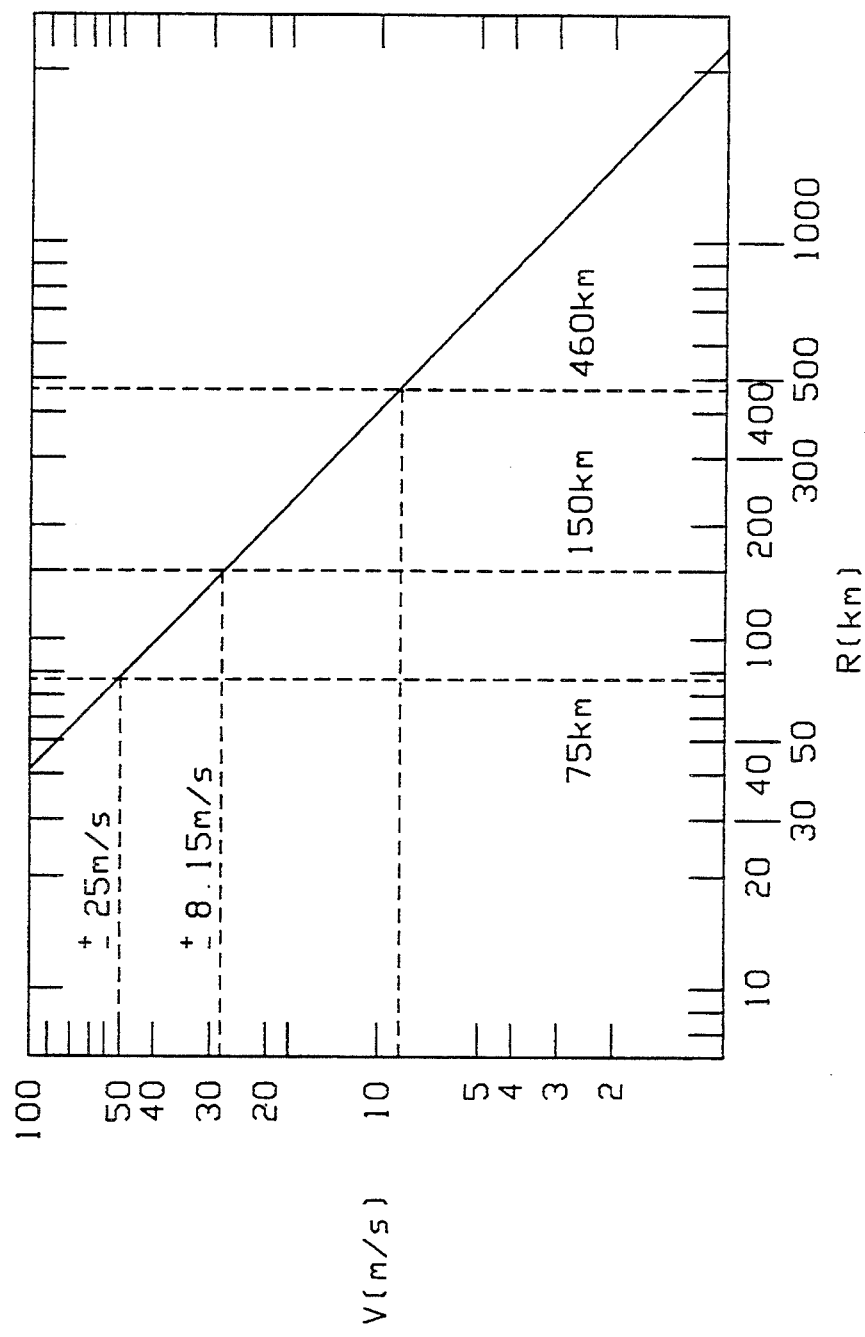
FIG. 1 is an illustration of the "pulse-Doppler dilemma" indicating the maximum unambiguous Doppler and range that can be measured for a given pulse repetition rate.
Figure 2:
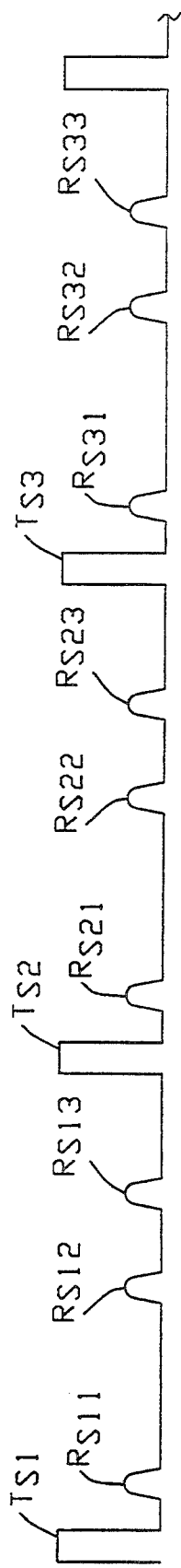
FIG. 2 is an illustration of a pulse repetition rate for unambiguous range determination.
Figure 3:
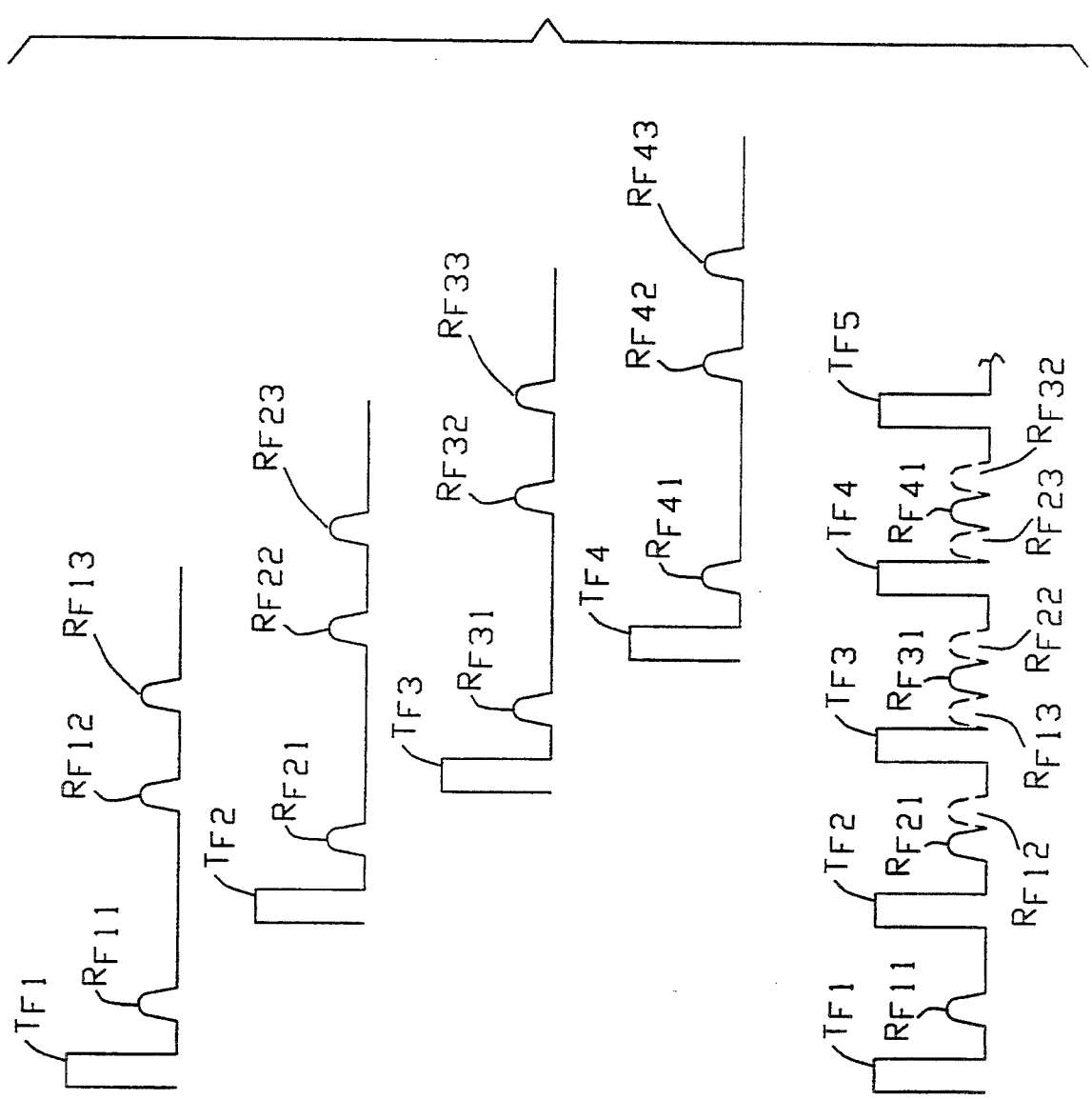
FIG. 3 is an illustration of a range ambiguous pulse repetition rate.

A pulse Doppler radar, configured in accordance with the present invention is shown in FIG. 5. Included in this pulse Doppler radar is a stabilized transmitter 11 which provides a pulse modulated carrier signal having a frequency which is the sum of two frequencies, $f_s + f_c$, where $f_s$ is the frequency of a stabilized oscillator (STALO) and $f_c$ is the frequency of a coherent oscillator (COHO). The carrier signal is modulated by a periodic waveform provided by a waveform generator 13. Each period in this waveform 15, shown in FIG. 6, includes three pulses, $P_1$, $P_2$, and $P_3$. The intervals between the pulses are unequal, $T_A$ being the interval between $P_1$ and $P_2$, $T_s$ being the interval between $P_2$ and $P_3$, and $T_c$ being the interval between $P_3$ and $P_A$ of the subsequent period. The total period, T, being equal $T_A + T_B + T_C$. As will be explained, this waveform, comprising three pulses with unequal intervals therebetween, is utilized to eliminate ambiguities in the measurement of the Doppler phase shift imposed on the radar signal returns.

Pulse modulated signals for transmission are coupled to an antenna 17 from the transmitter 11 via a duplexer 19. Pulsed signals backscattered from targets, such as meteorological scatterers, are received by the antenna 17 and coupled, via the duplexer 19, to a mixer 21, which also receives a signal at the STALO frequency $f_s$ from the transmitter 11 as the local oscillator signal. Signals at the intermediate frequency (IF) provided by the mixer 21 are amplified by an IF amplifier 23 and coupled to a phase detector 25, to which a signal at the COHO frequency $f_c$ is also coupled. The phase detector 25 may be of the type that provides two phase representative pulse train output signals, one, designated I, in phase with the COHO signal and the other, designated Q, in quadrature with the COHO signal. Pulse train signals, I and Q, are coupled to a clutter filter 27, which may be of the type disclosed by Rubin, et al in U.S. patent application Ser. No. 08/148,447, which is assigned to the present assignee and is incorporated herein by reference, wherein pulse train signals I and Q are processed separately for the removal of clutter. These clutter filtered I and Q pulse train signals are coupled to a processor 29 wherein they are autocorrelated for lags $T_A$, $T_B$, and $T_C$ in a correlator 31.

Refer now to FIGS. 7A through 7G, whereat time positions of received pulses, $r_i$ $i=1, 2, 3$, relative to the respective pulse transmission time are shown. The interpulse intervals $T_j$ have been chosen for the elimination of second time around (ambiguous) returns, thus eliminating range ambiguities and creating Doppler shifted frequency ambiguities. For efficient ambiguity elimination, yet to be described, the interpulse intervals are selected so that one interval is not equal to the sum of the other two or is not a harmonic of either of the other two. As will be explained subsequently, Doppler ambiguities may be resolved utilizing the autocorrelation phases obtained at three lags $T_A$, $T_B$, $T_C$. Since the I and Q signals are derived from the received pulses, this plot is also representative of the time positions, relative to respective pulse transmission, of the I and Q pulse train signals of the received pulses. In the figure $r_1$, $r_2$ and $r_3$ are time positions of the pulse train signals due to the reception of signals resulting from the transmission $P_1$, $P_2$, and $P_3$, respectively. Correlator 31 imposes time delays of $T_A$, $T_B$, and $T_C$ to the I and Q pulse train signals and correlates each delayed train with the undelayed train shown in FIG. 7A. In the train of I and Q signals delayed by $T_A$, shown in FIG. 7B, the return $r_1$ of the transmission $P_1$ correlates with the return $r_2$ of the transmission $P_2$ in the train of I and Q signals shown in FIG. 7A. Since these returns are from the same scatterer, the correlation of these signals is an autocorrelation and provides the autocorrelation function $R(T_A)$. It is shown in FIG. 7C that the correlation of $r_1$ with $r_2$ is the only correlation that occurs in the period $T_T = T_A + T_B + T_C$. Similarly, the return $r_2$ of the pulse transmission $P_2$ for the lag $T_B$, shown in FIG. 7D, correlates with the return $r_3$ of the pulse transmission $P_3$, shown in FIG. 7A, providing the autocorrelation function $R(T_B)$, and the return $r_3$ of the pulse $P_3$ for the lag $T_C$, shown in FIG. 7F, correlates with the return $r_1$ of the pulse transmission $P_1$, shown in FIG. 7A, providing the autocorrelation function $R(T_C)$. The time line results of these correlations are respectively shown in FIGS. 7E and 7G.

It should now be apparent that, for the interpulse spacings shown in FIG. 7A, lags $T_A$, $T_B$, and $T_C$ provide the following:

lag $T_A$ correlates $r_1$ and $r_2$, $r_1'$ and $r_2'$, etc.
lag $T_B$ correlates $r_2$ and $r_3$, $r_2'$ and $r_3'$, etc.
lag $T_C$ correlates $r_3$ and $r_1'$, $r_3'$ and $r_1''$, etc.

Lags equal to linear combinations of the interpulse spacings of FIG. 7A provide different correlations to the returned signals, as for example:

lag $(T_A + T_B)$ correlates $r_1$ and $r_3$, $r_1'$ and $r_3'$, etc.
lag $(T_A + T_C)$ correlates $r_3$ and $r_2'$, $r_3'$ and $r_2'$, etc.

Detected returns from meteorological scatterers may be modeled as a Gaussian process with a Gaussian power spectral density having a mean frequency $f_D$ related to the average radial velocity v of the scatterers relative to the illuminating radar by $$v = \frac{2f_D}{\lambda}$$

where $\lambda$ is the wavelength of the transmitted signal.

The autocorrelation function of the returned pulse train received by the radar may be written as:

$$R(\tau) = |R(\tau)|e^{j\theta(\tau)} = |R(\tau)|e^{j\omega_D\tau}$$

where $\omega_D = 2\pi f_D$. Since the power spectral density of the received signal is Gaussian shaped, $|R(\tau)|$, which is the inverse Fourier transform of the power spectral density, is also Gaussian shaped. The expected value of $\arg R(\tau) = \theta(\tau) = \omega_D \tau$ is a linear function of lag $\tau$, when the backscatter is moving radially at a constant rate relative to the radar receiver. Therefore, if $T_A = T_B = T_C = T$, $\theta(T) = \theta_T$, no noise is present, and the spectral density is very narrow then $\theta(2T) = 2\theta_T$ and $\theta(3T) = 3 2\theta_T = (3/2)\theta(2T)$. If the interpulse intervals are not equal and $\theta(T_A) = \theta_A$, then for the same conditions $\theta(T_B) = \theta_B = (T_B/T_A)\theta_A$ and $\theta(T_C) = \theta_C = (T_C/T_B)\theta_B$. Consequently, a plot of $\arg R(\tau) = \theta(\tau)$, the autocorrelation phase angle, vs $\tau$, the autocorrelation lag, is a straight line which passes through the origin. The slope of this straight line is the radian frequency $\omega_D$. When noise is present and/or the spectral density is broad, the value of $\theta(\tau)$ will fall close to a straight line whose slope is $\omega_D$.

From the above equation it is evident that $\theta(\tau)$ is modulo $2\pi$ and must be unwrapped at higher lag orders to remove the modulo $2\pi$ uncertainty before the best fit straight line and its slope can be obtained.

It follows from the above that, when the pulse train is corrupted by noise or the spectral width of the pulse train is large, the above relations become:

$$\theta(T) = \theta_T \theta(2T) \approx 2\theta_T \theta(3T) \approx 3\theta_T (3/2)\theta_{2T}$$

Noise and spectral width, however, do not prevent the unwrapping (unfolding) of $\theta(\tau)$, provided that fluctuations in $\theta(\tau)$ are much smaller than $\pi$. Since fluctuations of $\theta(\tau)$ are random and generally do not have a dc component, a plot of unfolded values of $\theta(\tau)$ vs lag will be distributed about a straight line that passes through the origin and has a slope $\omega_D$. Hence, an accurate method for estimating $\omega_D$ is to (i) calculate $\theta(\tau)$ for several lags, (ii) starting with the first lag, unfold successive values of $\theta(\tau)$, and (iii) pass a straight line from the origin ($\theta(0) = 0$) through the unfolded values in a least mean square sense. The well known pulse-pair technique for estimating $\omega_D$ is a special case of this procedure. This technique estimates the autocorrelation phase angle by correlating for only one lag that is equal to an interpulse period. The use of a multiplicity of higher order lags for velocity estimation provides a more accurate estimate, but requires that values of $\theta(\tau)$ for the higher order lags be unfolded to obtain the true autocorrelation phase angle at these lags. An unfolding procedure for an accurate unambiguous velocity determination is disclosed by Rubin, et al in co-pending U.S. patent application Ser. No. 08/65,971, which is assigned to the present assignee and is incorporated herein by reference.

The I and Q components of a received pulse train are coupled from the clutter filter 27 to a correlator 31 in the processor 29, wherein autocorrelations are performed with the appropriate delays. The components of the autocorrelation functions are provided from the correlator 31 to an argument (phase) determinator 33 which processes these components in accordance well correlation methods to obtain the phase angles of the autocorrelation function. Signals representative of these phase angles are coupled to a phase angle unwrapper 35 where the phase angles are unwrapped as will be explained.

Figure 8:
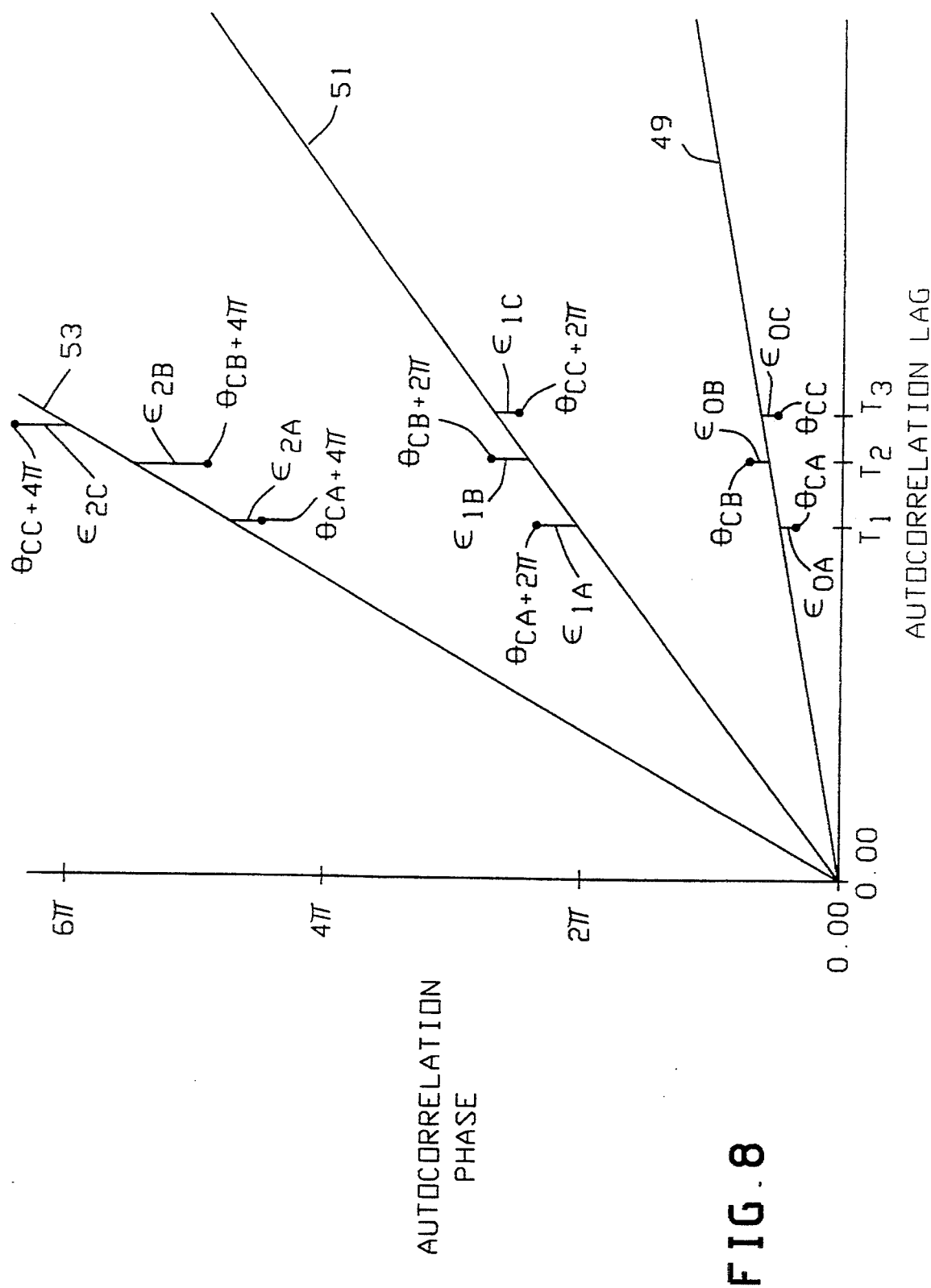
FIG. 8 is a plot of three straight lines least mean square fitted to wrapped and unwrapped autocorrelation pulse angles, useful for explaining the selection of the phase angle vs lag straight line which has a slope representative of the Doppler frequency shift.

Refer now to FIG. 8. As previously stated, the phase angles as determined by the correlation process, are modulo $2\pi$, so that the actual unfolded phase angle based on received data, $\theta_i$ may be written as:

$$\theta_i = \omega_D T_i = \theta_{Ci} + 2m\pi \quad m = 0, 1, 2, \ldots$$

where $\theta_{Ci}$ is the calculated value based on received data. The calculated phase angles $\theta_{CA}$, $\theta_{CB}$, and $\theta_{CC}$ for lags $T_A$, $T_B$, and $T_C$ are coupled to the unwrapping processor 35 wherein the unfolded phase angles are established. The unwrapping process commences with the assumption that the initial phase angle $\theta_{CA} = \theta_a$ is unambiguous. An unwrapping integer $m_B$ is established such that $$\left| \frac{T_B}{T_A} \theta_A - (\theta_B + 2m_{0A}\pi) \right| < \pi$$

Hence, $\theta_B = \theta_{CB} + 2m\pi$

Similarly, an unwrapping integer $m_C$ is establish such that $$\left| \frac{T_C}{T_B} \theta_B - (\theta_{CC} + 2m_C\pi) \right| < \pi$$

Hence, $\theta_C = \theta_{CC} + 2m_C\pi$

Signals representative of the three unwrapped phase angles are coupled to a least mean square fit processor 37 wherein a least mean square fit to a straight line 49, representing Phase Angle vs Lag, for the phase angles $\theta_A$, $\theta_B$, and $\theta_C$ is performed.

The unwrapping process is repeated for $\theta_{A1} = -\theta_{CA} + 2\pi$. New values of $m_B$ and $m_C$ are chosen to yield a new set of phase values: $\theta_{A1}$, $\theta_{B1}$, and $\theta_{C1}$. This process can be generalized as follows: Let $\theta_{kA} = \theta_{CA} + 2k\pi$ $k = 0, \pm 1, \pm 2 \ldots$ For each value of k find unwrapping integers $m_{kB}$ and $m_{kC}$ which yield the unwrapped phase set $\theta_{kA}$, $\theta_{kB}$, and $\theta_{kC}$ from the calculated values $\theta_{CA}$, $\theta_{CB}$, and $\theta_{CC}$. Straight lines 49, 51, and 53 in FIG. 8 are list mean square fits of $\theta_{kA}$, $\theta_{kB}$, and $\theta_{kC}$ to a straight line for $k = 0$, 1, and 2, respectively.

Continue to refer to FIGS. 5 and 8. Signals representative of each mean square error straight line and the phase angles from which the lines were derived are coupled to an RMS error evaluator 39 which evaluates the total mean square error fit to each line. This is accomplished determining offset errors $\epsilon_{kA}$, $\epsilon_{kB}$, and $\epsilon_{kC}$ respectively corresponding to the offset of $\theta_{kA}$, $\theta_{kB}$, and $\theta_{kC}$ from each of the lines constructed in accordance with the above. The total mean square error $\xi_k$ is given by:

$$\xi_k = \sqrt{\epsilon_{kA}^2 + \epsilon_{kB}^2 + \epsilon_{kC}^2}$$

where $k = 0, \pm 1, \pm 2$

The RMS errors so determined are coupled to line selector 41 which compares the RMS errors and selects the line corresponding to the k value having the minimum RMS error as the line representative of the Correct Phase Angle vs Lag straight line for the calculated modulo $2\pi$ autocorrelation phase angles. The selected straight line function is coupled to velocity determinator 43 wherein the slope, $n_k$, of the selected line is determined and the unambiguous velocity $v_u$ is established from:

$$v_u = \frac{n_k \lambda}{4\pi}$$

Backscatterer velocity is coupled from the velocity determinator 43 to a velocity mapper 45 which provides a map of velocity vs range.

Figure 9A:
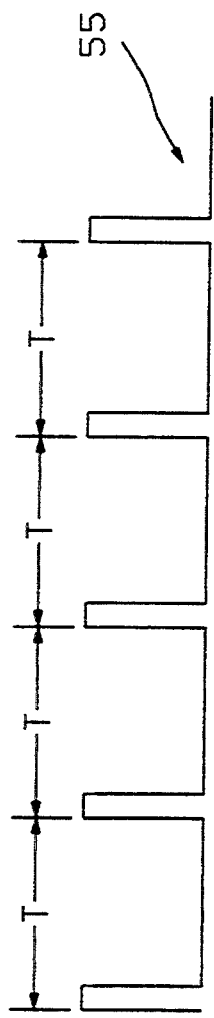
FIG. 9A illustrate a periodic waveform having a single pulse in each period.
Figure 9B:
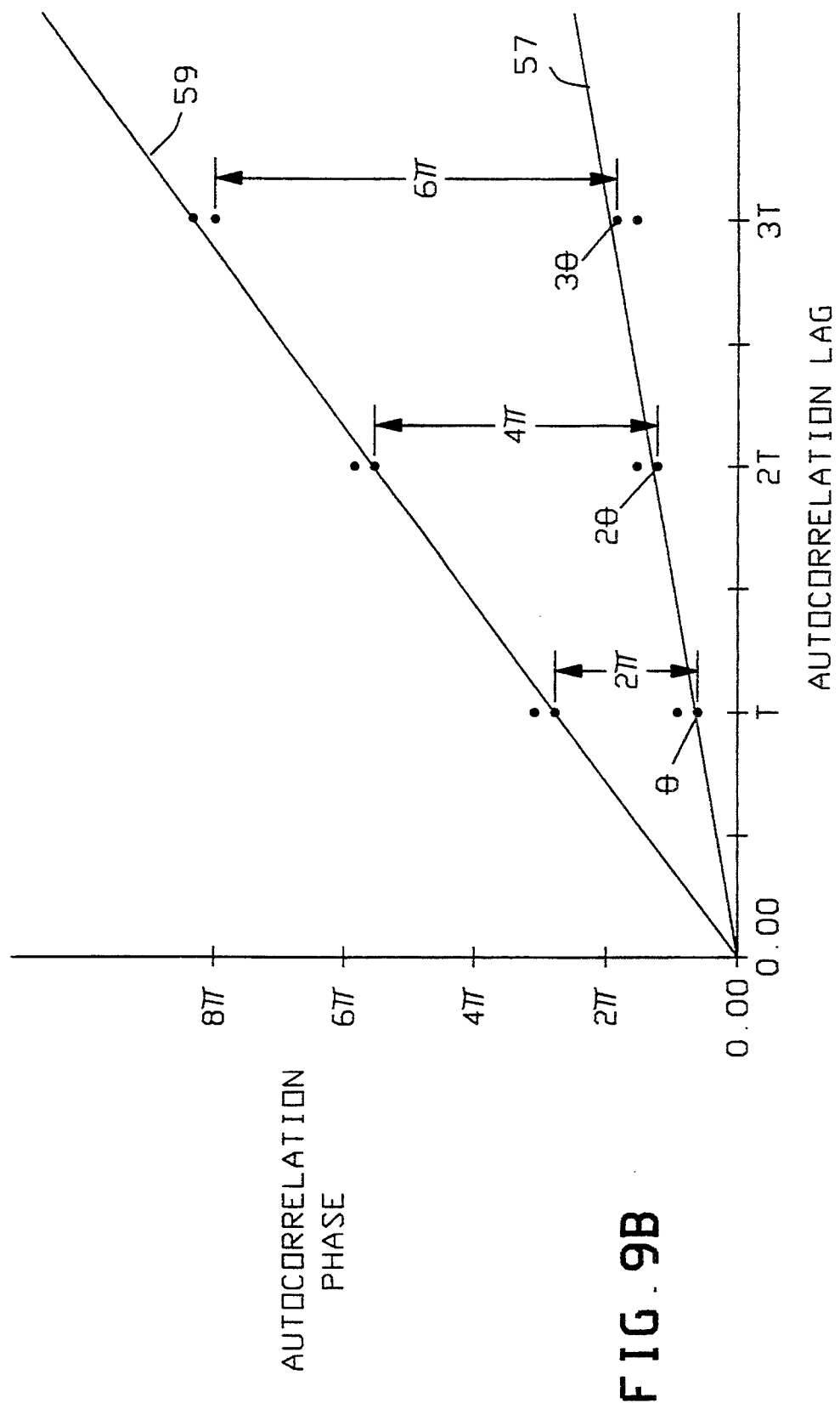
FIG. 9B illustrates two straight lines of phase angle vs lag useful for explaining the inherent correlation phase angle ambiguity of periodic wave modulation having a single pulse per period.

Refer now to FIGS. 9A and 9B. FIG. 9A shows a waveform 55 with uniform interpulse intervals. It will be shown that the application of the above process applied to a uniform pulse train $T_A = T_B = T_C$ does not resolve Doppler ambiguities. It should be remembered that the argument of R(0) is zero. The values of $\theta(\tau)$ for a uniform pulse repetition interval T in a noiseless environment can be written as $\theta(2T) = 2\theta(T)$
$\theta(3T) = 3\theta(T)$ It can readily be shown that $\theta_k(T)$, $\theta_k(2T)$, and $\theta_k(3T)$ fall on a straight line with a slope which is a function of the selected integer k. FIG. 9B shows a straight line 57 for k=0 on which $\theta_0(T)$, $\theta_0(2T)$, and $\theta_0(3T)$ fall and a line 59 on which $\theta_1(T)$, $\theta_1(2T)$, and $\theta_1(3T)$ fall. This is equivalent to stating that the value of k cannot be determined unambiguously from the values of $\theta(T)$, $\theta(2T)$, and $\theta(3T)$. Hence, a pulse train with a uniform pulse repetition rate is inherently ambiguous when the expected radial velocity range of the reflecting radar target is outside the Nyquist interval, that is $|2v/\lambda| > 1/(2T)$.

Figure 4A:
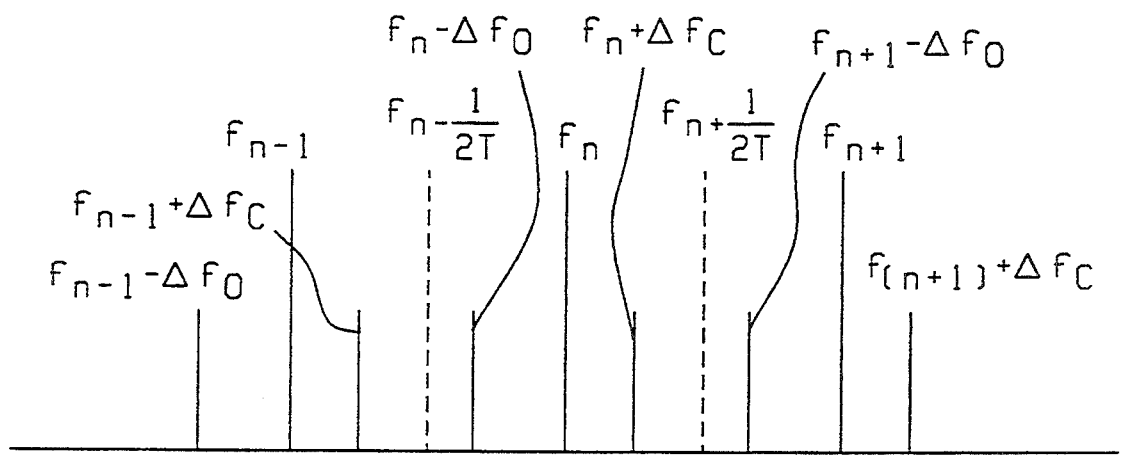
FIGS. 4A through 4C show spectral lines of a periodic pulse train, useful for explaining Doppler frequency shift ambiguities.
Figure 4B:
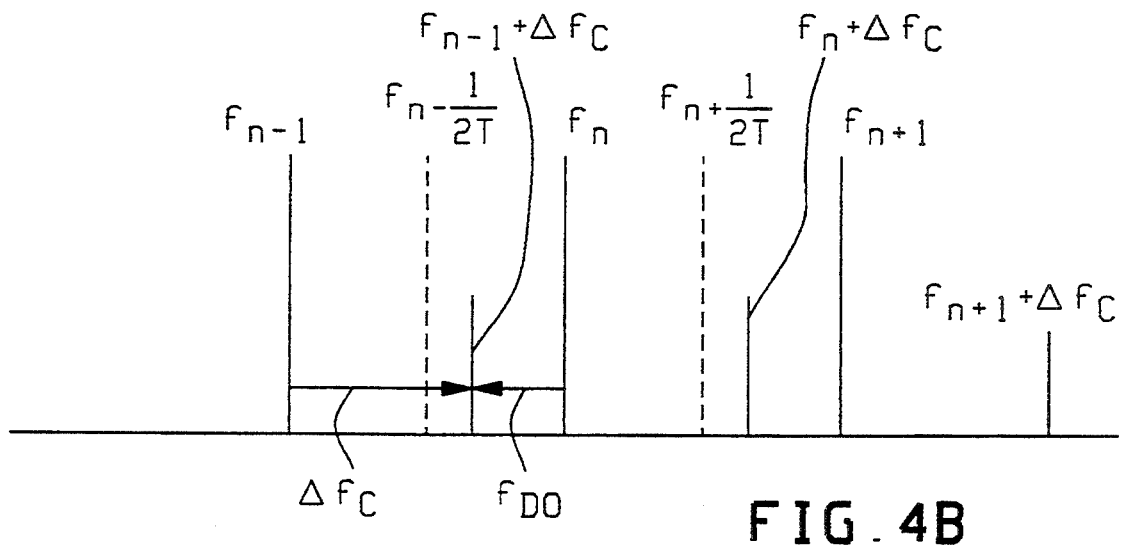
Figure 4C:
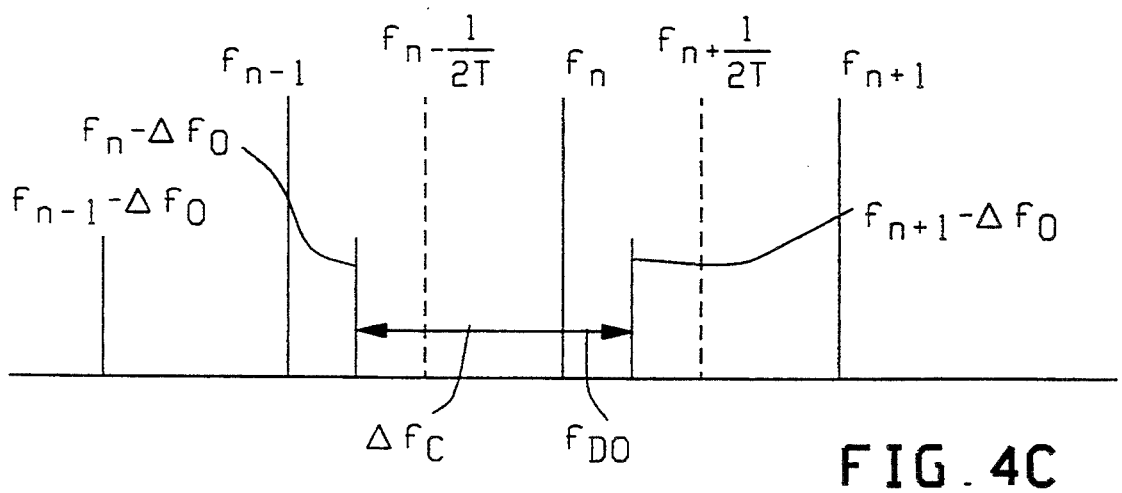

The inability of a periodic waveform to resolve Doppler ambiguities may be further explained with reference to FIGS. 4B and 4C, which may be transformed from the frequency domain to the phase domain by multiplying each spectral line by $2\pi T$. The phase angle difference $2\pi f_{n+1} T - 2\pi f_n T$ between spectral lines $f_n$ and $f_{n+1}$ is $2\pi$. Further, the phase difference between $2\pi(f_{n-1} + \Delta f_0)T$ and $2\pi(f_n + \Delta f_0)$ in FIG. 4B and the phase difference between $2\pi(f_n - \Delta f_0)T$ and $2\pi(f_{n+1} - \Delta f_0)T$ is also $2\pi$. Thus, adding $2k\pi$ to the phase angles of the autocorrelations, which are the phase angles of the doppler frequency shifts, just repeats the relationship of the spectral line phase shifts.

When two or more pulse repetitions are employed phase shifts due to $f_d = (2v)/\lambda < 1/(2T)$ can be resolved. Consider two alternating pulse repetition intervals $T_A$ and $T_B$ where $T_A < T_B$ and $T_A \neq kT_A$, where k is an integer. Assume that the Nyquist interval corresponding to $T_A$ is ambiguous but the Nyquist interval corresponding to $(T_B - T_A)$ is not ambiguous for the range of expected velocities to be measured. If $\theta_A = \theta_{CA} + 2k\pi$, then $\theta_n = T_B/T_A(\theta_A + 2k\pi)$. If one attempts to pass a straight line through the origin, $\theta_A$, and $\theta_B$, there is only one value of k for which this can happen, provided that the straight line corresponds to a velocity that causes a Doppler shift which is within the Nyquist interval corresponding to $(T_B - T_A)$. The presence of noise and random fluctuations cause the relationship between $\theta_A$ and $\theta_B$ to be approximately true, i.e.

$\theta_B \approx (T_B/T_A)$.

It can be shown that the maximum unambiguous Doppler frequency that can be obtained is $$f_{DM} = \pm \frac{1}{(T_2 - T_1)}$$

Thus the maximum velocity that can be determined is $$v_m = \frac{\pm \lambda}{2(T_2 - T_1)}$$

In order to minimize dealiasing errors caused by an incorrect straight line fit to the data in a least mean square sense, one can employ additional pulse repetition intervals, for $T_A < T_B < T_C$, where $(T_B - T_A)$ and $(T_C - T_B)$ correspond to Nyquist intervals that are not ambiguous for the range of expected velocities to be measured. The requirement that all 3 points fall on a straight line passing through the origin in a least mean square sense reduces the probability of an error when noise and process fluctuations are present.

After the least mean square fit is performed, it should be evident that the line 51 possesses the minimum RMS error of all the lines passing through the point (0,0), that it is the argument vs lag function for the data processed, and that its slope is the Doppler shifted frequency from which the target velocity may be determined.

Figure 10A:
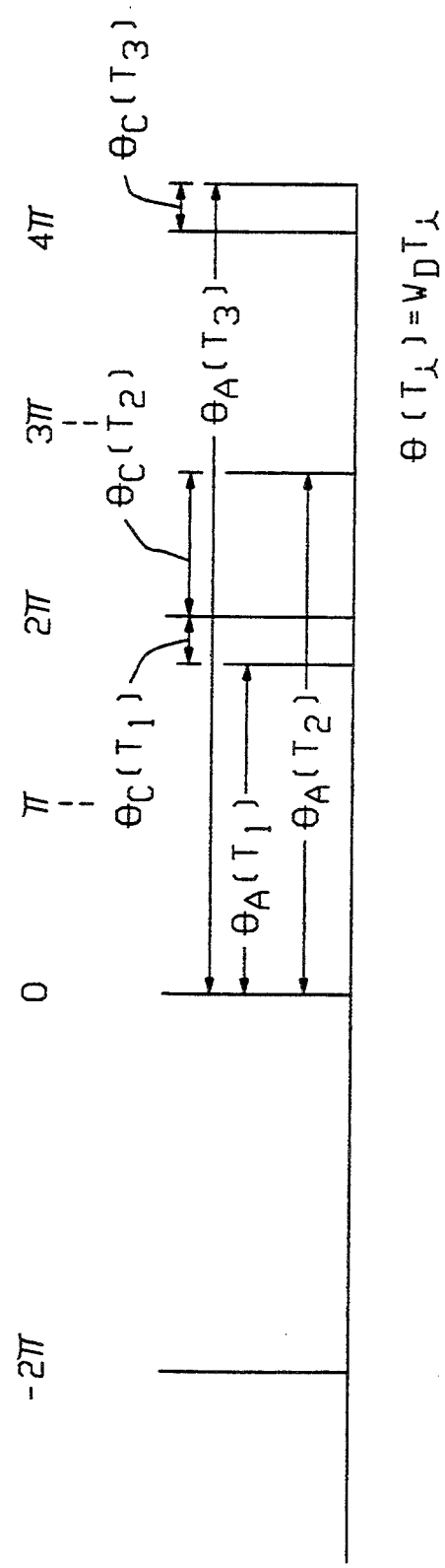
FIG. 10A represents ambiguous autocorrelation phase angles obtained for a multipliciy of lags.
Figure 10B:
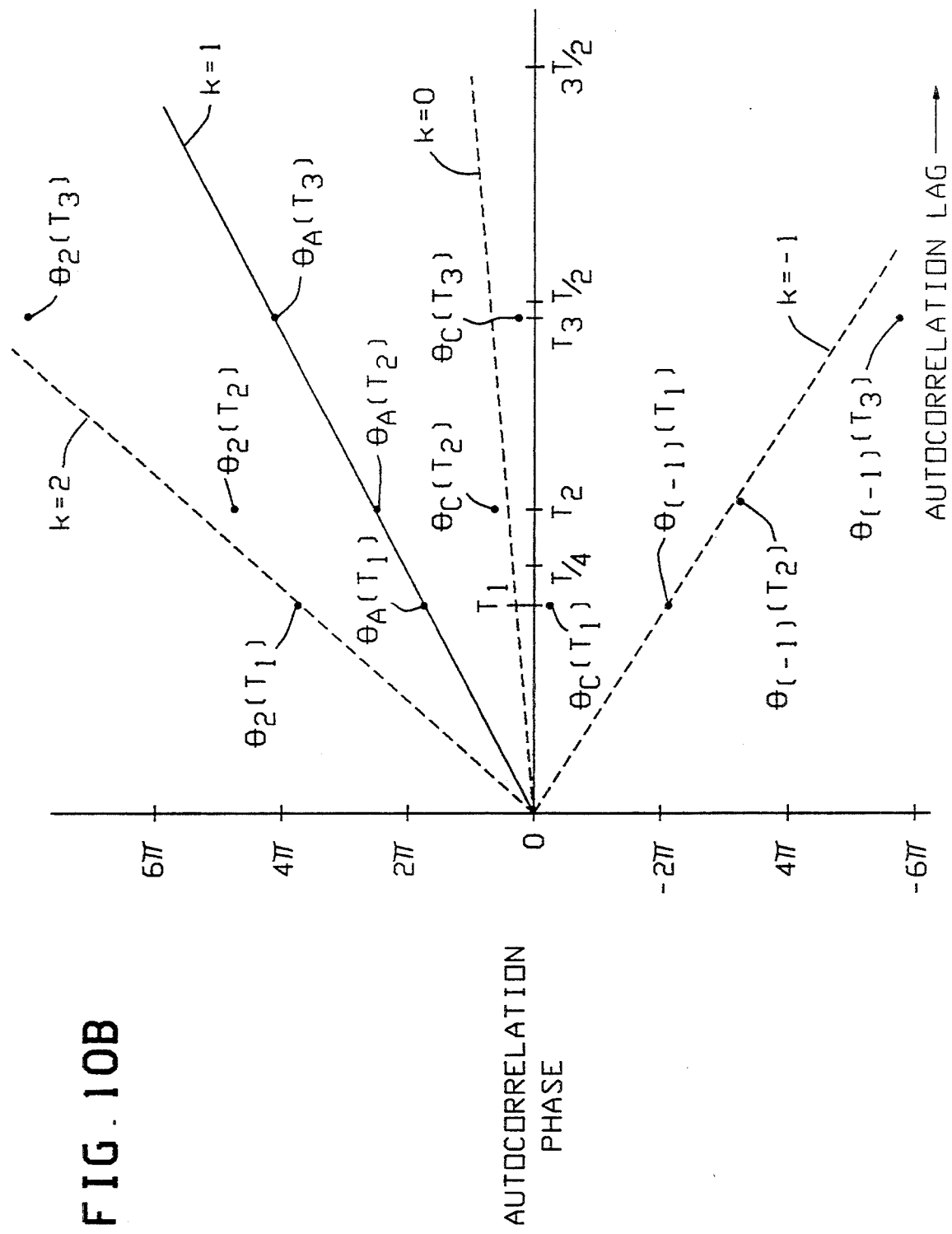
FIG. 10B shows plots of phase angles of FIG. 10A unwrapped on a autocorrelation phase vs autocorrelation lag coordinate system.

An example of how phase ambiguities are resolved, when the phase for all lags of the autocorrelation function are ambiguous, will be given with reference to FIGS. 10A and 10B. The autocorrelation function is sampled with three lags $T_1$, $T_2$, and $T_3$. As shown in FIG. 10A: the actual phase angle $\theta_A(T_1)$ is greater than $\pi$ so that the phase angle calculated by the autocorrelation process is an angle $\theta_C(T_1)$, is a negative angle that is less than $\pi$; the actual phase $\theta_A(T_2)$ is between $2\pi$ and $3\pi$ so that the phase angle $\theta_C(T_2)$ calculated by the autocorrelation process is a positive angle less than $\pi$; and the actual phase angle $\theta_A(T_3)$ is between $4\pi$ and $5\pi$ so that the calculated phase angle $\theta_A(T_3)$ is a positive angle less than $\pi$. Assuming a noiseless process, the positive angle less than $\pi$. Assuming a noiseless process, the calculated phase angles $\theta_C(T_1)$, $\theta_C(T_2)$, and $\theta_C(T_3)$ and the unwrapped phase $\theta_1(T_1)$, $\theta_1(T_2)$, $\theta_1(T_3)$ for k=1; $\theta_1(T_1)$, $\theta_1(T_2)$, $\theta_1(T_3)$ for k=2; and $\theta_{(-1)}(T_1)$, $\theta_{(-1)}(T_2)$, $\theta_{(-1)}(T_2)$ for k=−1 are shown in FIG. 10B. The phase $\theta_1(T_1)$, $\theta_1(T_2)$, $\theta_1(T_2)$, and the point (0,0) all fall on the line corresponding to k=1, while no straight line, which passes through the point (0,0) can be drawn through the phase angles of the three sets corresponding to k=0, k=2, and k=−1. Consequently, $\theta_A(T_1)$, $\theta_A(T_2)$, $\theta_A(T_3)$ respectively correspond to $\theta_A(T_1)$, $\theta_1(T_2)$, $\theta_1(T_3)$ and the slope of the line for k=1 is equal to $\omega_n$.

Though the explanations given above utilize the arguments of autocorrelations for three lags, this is not a limitation. Arguments of autocorrelations for two or more lags may be utilized in the manner described for the determination of the line slopes that establish the Doppler frequency shift.

It is well known that the reflectivity of the backscatterers may be determined from the zero lag autocorrelation function, R(0). The values I and Q may be coupled to a reflectivity mapper 47 which provides a map of reflectivity vs range for the backscatterers, utilizing the I and Q values in the well known manner to obtain R(0).

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A Doppler radar of the type having a stabilized transmitter for transmitting pulse modulated signals and a receiver for receiving radar returned signals further comprising:

waveform generator means coupled to said transmitter for providing a periodic modulating waveform, each period including a plurality of pulses positioned with unequal intervals therebetween, thereby causing periodic pulse modulated radiated signals with each period having a plurality of radiated pulse modulated signals with unequal intervals therebetween;

correlation means coupled to said receiver for performing autocorrelations of returned radar signals, lags for said autocorrelations being equal to said unequal intervals between said plurality of pulses positioned in said period, and for providing signals representative of said autocorrelations, said autocorrelations having an amplitude and a phase; and Doppler frequency shift means coupled to receive said autocorrelation representative signals for providing signals representative of Doppler frequency shifts of said returned radar signals.

2. A Doppler radar in accordance with claim 1 wherein said Doppler frequency shift means comprises:

means coupled to receive said autocorrelation representative signals for providing signals representative of said phase angles of said autocorrelations; and frequency shift means coupled to receive said phase angle representative signals for providing signals representative of said Doppler frequency shifts.

3. A Doppler radar in accordance with claim 2 wherein said phase angle means comprises:

means coupled to receive said phase angle representative signals for selecting a k value and adding $2k\pi$, $k=0, \pm 1, \pm 2, \pm 3, \ldots$, to a first phase angle $\theta_C(T_1)$ to obtain an augmented first phase angle representative signal, said first phase angle $\theta_C(T_1)$ being said phase angle of an autocorrelation for lag $T_1$;

means coupled to said correlation means to receive at least one autocorrelation phase angles $\theta_C(T_j)$ respectively obtained for lags $T_j$, $j \neq 1$, for determining an integer $m_{kj}$ for each phase angle $\theta_C(T_j)$ where $m_{kj}$ is determined from $$\left| \frac{T_j}{T_{j-1}} \theta'_{kC}(T_{j-1}) - (\theta_{kC}(T_j) + 2m_{kj}\pi) \right| < \pi$$

and to provide signals representative of said at least one augmented phase angles $\theta_C'(T_j) = \theta_C(T_j) + 2m_{kj}\pi$;

line means coupled to receive said augmented first phase angle representative signal and said at least one augmented phase angles representative signals for determining a least mean square fit of said augmented first phase angle and said at least one augmented phases angles to a straight line passing through an origin of a phase angle vs lag coordinate system for each selected k value, and for providing signals representative of said straight lines respectively corresponding to said k values;

evaluation means coupled to receive said augmented first phase angle representative signal, said at least one augmented phase angles representative signals, and said straight lines representative signals for determining root mean square (RMS) offset error of said augmented first phase angle and said at least one augmented phase angles from each of said straight lines and selecting that one of said straight lines with a RMS offset error that is less than RMS offset errors of all other straight lines, thus providing a selected straight line with minimum RMS offset error, said selected straight line having a slope representative of Doppler shifted frequency due to a velocity of a scatterer from which radar return signals emanate, and for providing a signal representative of said selected straight line; and slope means coupled to receive said selected straight line representative signal for determining said slope and for providing a signal representative thereof.

4. A Doppler radar in accordance with claim 3 further including means coupled to said slope means for determining velocity of said scatterer from said slope.

5. A method of determining velocity of a moving target comprising the steps of:

radiating a signal modulated by a periodic waveform, each period of said periodic waveform including a plurality of pulses positioned with unequal intervals therebetween;

autocorrelating received backscattered returns from said target using lags equal to said unequal intervals to obtain autocorrelations of said received backscattered returns for lags equal to said unequal intervals, each of said autocorrelations having an amplitude and a phase; and utilizing said autocorrelations for determining target velocity.

6. A method in accordance with claim 5 wherein said utilizing step includes the steps of:

extracting said phase angle from each of said autocorrelations to provide extracted phase angles; and processing said extracted phase angles to obtain said target velocity.

7. A method in accordance with claim 6 wherein said processing step includes the steps of:

adding $2k\pi$, $k=0, \pm 1, \pm 2, \pm 3, \ldots$, for a selected k value to a first phase angle to obtain an augmented first phase angle said first phase angle being said phase angle of an autocorrelation for lag $T_1$;

determining an integer $m_{kj}$ for at least one autocorrelation phase angles $\theta_C(T_j)$, respectively obtained with lags $T_j$, $j \neq 1$; and providing signals representative of at least one augmented phase angles, $\theta_C'(T_j) = \theta_C(T_j) + 2m_{kj}\pi$, where $m_{kj}$ is determined from;

$$\left| \frac{T_j}{T_{j-1}} \theta'_{kC}(T_{j-1}) - (\theta_{kC}(T_j) + 2m_{kj}\pi) \right| < \pi$$

determining a least mean square fit of said augmented first phase angle and said at least one augmented phases angles to a straight line passing through an origin of a phase angle vs lag coordinate system for each selected k value, thereby providing a plurality of said straight lines respectively corresponding to said k values;

calculating a root mean square (RMS) error of said augmented first phase angle and said augmented at least one phase angles for each k value corresponding straight line;

selecting that straight line with a RMS offset error that is less than RMS offset errors of all other k value corresponding lines, thus providing a selected straight line with minimum RMS offset error, said selected straight line representative of autocorrelation phase angle versus lag and having a slope representative of Doppler frequency shift due to said target velocity; and determining said target velocity from said Doppler shift.

* * * * *

UNITED STATES PATENT AND TRADEMARK OFFICE
CERTIFICATE OF CORRECTION

PATENT NO. : 5,442,359
DATED : August 15, 1995
INVENTOR(S) : William L. Rubin

It is certified that error appears in the above-indentified patent and that said Letters Patent is hereby corrected as shown below:

In column 2 line 37 change "$T^{S1}$" to --$T_{S1}$--
In column 10 line 50 "$\theta_1(T_1)$" to --$\theta_2(T_1)$--;
"$\theta_1(T_2)$" to --$\theta_2(T_2)$--;
"$\theta_1(T_3)$" to --$\theta_2(T_3)$--

Signed and Sealed this

Twenty-fifth Day of November, 1997

Attest:

BRUCE LEHMAN

Attesting Officer

Commissioner of Patents and Trademarks